June 7, 1938.                E. KOSZALKA, JR                  2,119,712
                              CAMERA SHUTTER
                             Filed May 6, 1936
FIG.1.                                    FIG.2.
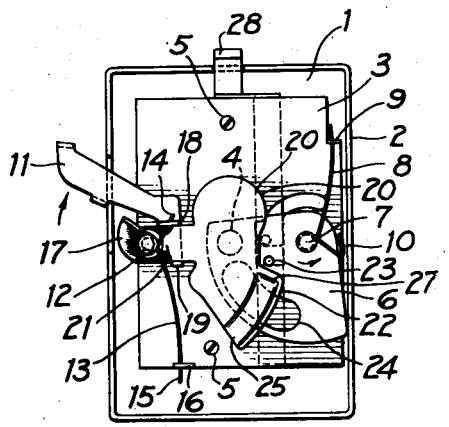    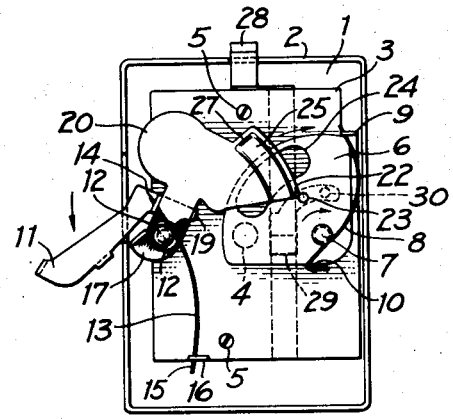
FIG.5.            FIG.3.            FIG.4.
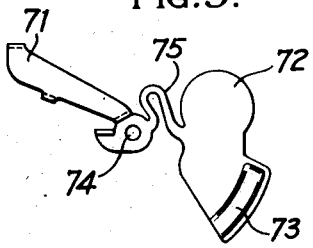    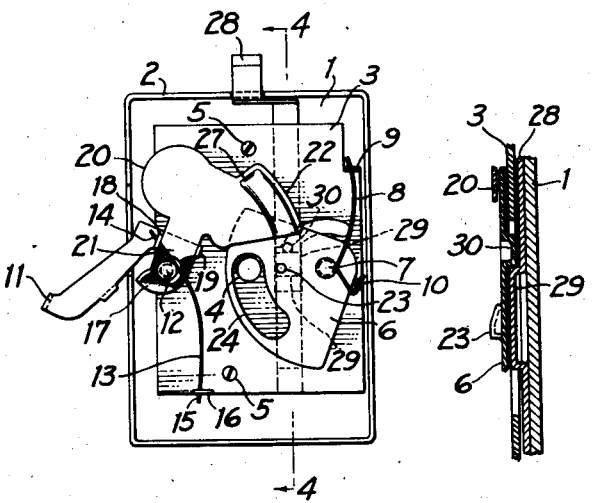
FIG.6.
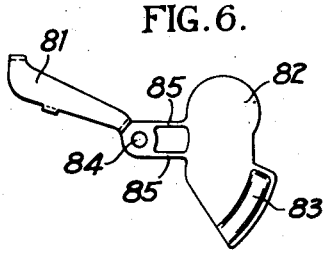
FIG.7.
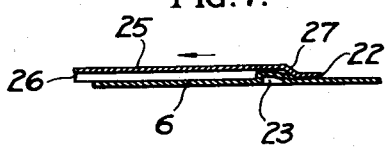
INVENTOR.
Edward Koszalka, Jr.
BY
                        ATTORNEYS Patented June 7, 1938

2,119,712

UNITED STATES PATENT OFFICE 2,119,712

CAMERA SHUTTER

Edward Koszalka, Jr., Rochester, N. Y., assignor, by mesne assignments, to Eastman Kodak Company, Jersey City, N. J., a corporation of New Jersey Application May 6, 1936, Serial No. 78,157

9 Claims. (Cl. 95—60)

This invention relates to photography and more particularly to photographic shutters. One object of my invention is to provide a photographic shutter in which the exposure will be constant, the speed of the exposure depending solely upon a single operating spring. Another object of my invention is to provide a shutter of the blade and cover type in which resilience of the cover member is provided laterally of the trigger pivot, but resilience of the cover in a direction transverse to the trigger pivot is at the same time quite limited. Another object of my invention is to provide a shutter with a novel means of producing an exposure of prolonged duration. Still another object of my invention is to provide a shutter in which the action of the trigger requires extremely little power to operate the camera, and in which the camera parts move smoothly and lightly with very little rebound, and other objects will appear from the following specification, the novel features being particularly pointed out in the claims at the end thereof.

It has been found that with the more modern miniature types of cameras, shutters that have heretofore been entirely satisfactory are objectionable because with a small light camera, it is particularly difficult to hold the camera steady during exposure, and the usual types of shutters tend to shake the camera in spite of the fact that they were satisfactory for larger and heavier cameras. One of the primary objects of this shutter is to produce a shutter with extremely light trigger action, and one in which the shutter has practically no tendency to shake the camera.

Coming now to the drawing wherein like reference characters denote like parts throughout:

Fig. 1 is a plan view of a preferred type of shutter constructed in accordance with and embodying a preferred form of my invention with the shutter cover removed.

Fig. 2 is a view similar to Fig. 1 but with the shutter parts almost in position to make an instantaneous exposure.

Fig. 3 is a view similar to the preceding views, but with the shutter parts in position for taking a prolonged exposure.

Fig. 4 is an enlarged fragmentary detail section on line 4—4 of Fig. 3.

Fig. 5 shows a cover and trigger made in accordance with a second embodiment of my invention.

Fig. 6 shows a blade and cover made in accordance with still another embodiment of my invention, and Fig. 7 is an enlarged fragmentary detail section through a portion of the shutter blade and cover.

As a preferred form of my invention I have illustrated an extremely simple type of shutter in which there may be a casing 1 surrounded by a flange 2 forming a box-like housing. In this housing there is a support in the form of a plate 3 apertured at 4 to permit light rays to enter and pass through a lens to a film in the usual manner. The plate 3 is preferably attached to the shutter casing 1 by means of a pair of screws 5. I find it convenient to assemble all of the shutter parts on this plate, as this greatly facilitates assembling the camera.

A shutter blade 6 is pivotally attached at 7 to the support 3 and a spring 8 engaging a lug 9 on the support and a lug 10 on the shutter blade always tends to turn the blade in the direction shown by the arrow, which is its normal operative position, that is, in this position the shutter blade totally covers the aperture 4 through which the exposure is made.

In order to move the shutter blade 6, I provide a trigger with which is combined a cover as will now be described. The trigger 11 consists of a plate which is pivoted at 12 to the support 3 and which is normally turned to the position shown in Fig. 1 by a spring 13, one end of which 14 engages a portion of the trigger and the other end of which 15 engages a lug 16 on the support 3.

This trigger is provided with a flat formation 17 which lies between the shoulders 18 and 19, so that a cover plate 20 can be held between these shoulders and the pivot 12, so that it will move integrally with the trigger as the trigger is moved about its pivot. However, the plate 20 may move to and from the formation 17 between the shoulders 18 and 19, since the dimensions are such that flexing axially of pivot 12 is permitted.

In this form the trigger and cover are made of two separate parts, so that the cover member 20 may be made of a resilient piece of metal and so that the trigger 11 may be made of a more substantial non-resilient piece of metal.

In order to increase the resiliency of the cover axially of the pivot 12, I prefer to provide a narrow neck 21. This neck flexes permitting the cover to move a short distance toward and from the shutter blade 6. However, the cross-section is of sufficient size to cause the shutter blade to move radially about the pivot 12 with the trigger 11. The reason for this is that the cover carries a cam edge 22 which operates the shutter blade 6 through engagement with the beveled stud 23 in the following manner: With the parts in the position shown in Fig. 1, the trigger 11 is depressed. As it turns about the pivot 12, the cover plate 20 likewise turns about the pivot, and the cam edge 22 will engage the beveled stud 23, swinging the shutter blade 6 about its pivot.

During the time that the exposure slot 24 of the shutter blade is passing the exposure aperture 4 in the support 3, the cover 20 lies over the opening 4, thus preventing light from entering. However, as the motion is continued, as indicated in Fig. 2, the cover 20 moves away from a position over the opening 4, so that when the shutter blade 6 is permitted to turn under the impulse of its spring 8, which occurs as soon as the cam surface 22 slides off of the beveled stud 23, the shutter can make an exposure as the slot 24 swings past the opening 4.

The length of this slot and the strength of the spring 8 are regulated, preferably so that the exposure will have approximately one-twenty-fifth of a second duration. This time has proven the most satisfactory for general purpose work.

With the trigger 11 depressed a slight distance further than is shown in Fig. 2, so that the instantaneous exposure has been made, the shutter blade 6 returns to the position shown in Fig. 1. As the trigger 11 is released, and as the spring 13 moves it back toward the position shown in Fig. 1, the resilience of the cover 20 permits it to slide up over the beveled stud 23 so that the cam edge 22 may reach the position shown in Fig. 1, ready for a second exposure.

As best shown in the detail section in Fig. 7, the cover 20 is formed with an embossed area 25, which is arcuate in shape and which has an open end 26, the shape and position of this embossing being such that the beveled stud 23 readily slides beneath the embossing, and when the shoulder 27 is reached, the cover 20, due to the flexible narrow neck 21, may readily flex and ride up over the top of this stud.

I have found a number of different constructions desirable for increasing the flexibility of the trigger cover. For instance, the construction shown in Fig. 5 has proven satisfactory. In this form the trigger 71 is of the same shape as the trigger shown in Fig. 1, but, in this instance, the trigger and the cover 72 are made of one piece of metal, the cover being embossed at 73, as described above, to facilitate sliding over the beveled shutter blade lug 23. In this instance, the cover 72 is made quite resilient axially of the trigger pivot 74 by means of a narrow curved neck 75. While this neck permits the cover to flex axially of the pivot, it is nevertheless sufficiently strong to cause the cover 72 to turn with the trigger 71 in order to make exposures.

In the embodiment shown in Fig. 6, the trigger 81 and cover 82 are made of a single piece of metal, the cover being embossed at 83 and being adapted to turn with the trigger 81 about the pivot 84. In this form, the resilience of the cover 82 is increased by connecting the cover to the trigger proper, by means of a pair of parallel narrow neck members 85. These can be made quite thin to make the shutter cover flex sufficiently easily, and yet being spaced apart, they cause the cover 82 to turn about the pivot 84 with the trigger 81, without flexing radially of the pivot 84.

Whatever type of shutter and cover may be used, the action of the shutter is exactly the same as that described with the embodiment shown in the first three figures.

It is necessary with shutters of this type to make exposures longer than the so-called instantaneous exposures, and with my present shutter I have found that a prolonged exposure of the so-called "bulb" type can readily be procured in the following manner: Referring particularly to Figs. 3 and 4, the time exposure lever 28 is mounted to slide beneath the support 3 and is provided with an offset formation 29, as best shown in Fig. 4. This forming is adapted to engage a protuberance 30, which is formed on the lower side of the shutter blade 6. Normally, when the exposure lever 28 is in the position shown in Figs. 1 and 2, the protuberance 30 does not contact with the formation 29. However, when it is desired to make a prolonged exposure, the time lever 28 is drawn out to the position shown in Fig. 3, and this movement engages the protuberance 30 and moves the shutter blade a distance sufficient to cause one end of the slot 24 to lie over the exposure aperture 4. However, the movement of the shutter blade 6 does not move the cover 20 nor the trigger 11. By reference to Fig. 1 it will be seen that the exposure opening 4 would therefore still be covered by the cover 20.

When the trigger is pressed to make an exposure, the cover will move until the cam surface 22 engages the beveled lug 23, and the shutter will be swung about its pivot 7 just as for making an instantaneous exposure, the exposure opening 4 being covered by the cover 20 until the shutter blade reaches the position shown in Fig. 2. As soon as the slip-off occurs, the shutter blade will return, not to its initial position as shown in Fig. 1, but to its prolonged exposure position shown in Fig. 3. Thus, the protuberance 30 will strike the formation 29 and will be stopped, with the exposure opening 4 uncovered so that an exposure will start.

This exposure will continue until the trigger 11 is depressed, permitting the cover plate to return to the position shown in Fig. 1 covering the opening 4. However, the shutter blade 6 can only return to the position shown in Fig. 1 when the time lever 28 is pressed downwardly to move the formation 29 out of the path of the protuberance 30.

There are several ways a time exposure can be made. It can be made by drawing up on the time lever 28 to move the shutter blade, depressing the trigger 11 to the slip-off point and permitting the shutter blade to end the exposure by swinging over the exposure aperture 4. Instead of permitting the shutter blade to return to its initial position, an operator may depress the time lever 28. Since this moves the formation 29 away from the path of the protuberance 30, it will end the exposure, since the shutter blade will then close the exposure aperture 4.

From the above description, it will be seen that I have provided an extremely simple type of shutter in which the cover, because of its narrow flexible neck, can readily move or flex axially of the trigger pivot a sufficient distance to slide over the beveled stud with a minimum effort. This is useful because if there were more power required for flexing the cover, the spring 13, which returns the trigger to a normal position, would have to be made heavier, and greater pressure would be required on the trigger to actuate the shutter, so that the possibilities of the shutter shaking the camera would also be considerably greater. However, the cover can be made to flex with extremely light pressure when constructed in accordance with my invention, so that it has been found that a trigger spring exerting an ounce or an ounce and a half of pressure is quite sufficient for satisfactory operation. In shutters of this general type, it frequently happens that a 4 to 6-ounce pressure is required to operate the trigger.

With my improved shutter, exposures of greater duration than instantaneous can be very easily made by definitely moving the blade directly from the time lever, in order to position the shutter blade for making time exposures.

While I have illustrated a number of preferred embodiments of my invention, I do not wish to be limited solely to these embodiments, but only by the scope of the appended claims.

What I claim as my invention and desire to be secured by Letters Patent of the United States is:

1. In a photographic shutter, the combination with a support having an aperture through which an exposure may be made, of a shutter blade pivotally mounted thereon and including a protuberance, a spring tending to hold the shutter blade in one position, a trigger pivotally mounted on the support, an arm carried by the trigger and adapted to swing over the shutter blade, said arm including a narrow resilient neck and a surface adapted to engage and move the protuberance and the shutter blade, the pivotal relations of the shutter blade and trigger being such that movement of the trigger in one direction may cause the arm to engage and move the protuberance and shutter blade until the latter slips off to make an exposure, and movement of the trigger in an opposite direction may allow the arm to flex at the resilient neck to slide over the protuberance.

2. In a photographic shutter, the combination with a support having an aperture through which an exposure may be made, of a shutter blade pivotally mounted thereon and including a protuberance, a spring tending to hold the shutter blade in one position, a trigger mounted on the support, an arm carried by the trigger adapted to swing over the shutter blade, said arm including a portion shaped to increase the resiliency of the arm axially of the trigger pivot, said arm including a surface adapted to engage and move the protuberance and the shutter blade, the pivotal relations of the shutter blade and trigger being such that movement of the trigger in one direction may cause the arm to engage and move the protuberance and shutter blade until the latter slips off to make an exposure, and movement of the trigger in the opposite direction may allow the arm to flex at the portion shaped to increase the resiliency thereof axially of the trigger pivot so as to slide over the protuberance on the shutter blade.

3. In a photographic camera, the combination with a support having an aperture through which an exposure may be made, of a shutter blade pivotally mounted thereon and including a protuberance, a spring tending to hold the shutter blade in one position, a trigger pivotally mounted upon the support, an arm carried by the trigger adapted to swing over the shutter blade, said arm including a narrow neck curved in shape and extremely resilient axially of the trigger pivot and relatively stiff transversely of the trigger pivot, said arm including a surface adapted to engage and move the protuberance and the shutter blade, the pivotal relations of the shutter blade and trigger being such that movement of the trigger in one direction may cause the arm to engage and move the protuberance and shutter blade until the latter slips off to make an exposure, and movement of the trigger in an opposite direction may allow the arm to flex in the curved portion which is resilient axially of the trigger pivot so as to slide over the protuberance.

4. In a photographic shutter, the combination with a support having an exposure opening therein, of a shutter blade pivotally mounted thereon and movable to an operative position covering said opening by a spring, means for making an instantaneous exposure including a trigger and cover blind, a pivotal mount for the trigger and cover blind and cooperating parts thereon and on the shutter blade forming a slip-off connection when said trigger and shutter blade are moved on their pivotal mounts by which the shutter blade may be set against its spring tension and released for making an exposure, and a movable time lever positioned to engage and move the shutter blade from its operative position to a position exposing the exposure opening whereby a time exposure may be made by actuating said trigger.

5. In a photographic shutter, the combination with a support having an exposure opening therein, of a shutter blade pivotally mounted thereon and movable to and from an operative position covering said opening by a spring, means for making an instantaneous exposure including a pivoted trigger and cover blind and cooperating parts thereon and on the shutter blade forming a slip-off connection when said trigger and shutter blade are moved on their pivots by which the shutter blade may be set against its spring tension and released for making an exposure, and means including a time lever, and a movable mount therefor on which said lever may be moved to engage and move said shutter blade for initially altering the position of the shutter blade from its operative position to an inoperative position uncovering the exposure aperture, said trigger and cover blind being adapted to move said blade from said set position to tension its spring and upon slipping off to permit said spring to return the shutter blade to its inoperative position whereby the exposure opening may be closed by the trigger and cover blind to complete a time exposure.

6. In a photographic shutter, the combination with a support having an exposure opening therein, of a shutter blade pivotally mounted thereon, a spring tending to hold the blade in an operative position covering the exposure opening, two independent means for operating the shutter blade, one including a trigger and cover blind and a pivot on which the trigger and cover blind may move to engage the shutter blade and the other a time lever, a slidable mount therefor on which said lever may move to engage the shutter blade, the former and the shutter blade including cooperating parts adapted to engage and slip off as the trigger is moved to move the shutter blade, the latter including a said lever when moved on its mount to engage and move the shutter blade from an operative position covering the exposure opening to an inoperative position uncovering the opening for making exposures of some duration.

7. In a photographic shutter, the combination with a shutter blade having an exposure opening therein, a lens support including an aperture through which an exposure may be made, said aperture being normally covered by the shutter blade, a projection on the shutter blade, a trigger including an arm adapted to engage the projection on the shutter blade, a pivotal mount for the trigger on which it may move to engage and slip off said projection on said shutter blade, said arm including a narrow resilient neck between the arm and trigger permitting the former to move in one direction without moving the latter, the arm and shutter leaf being pivotally mounted whereby movement of the trigger in one direction may be transmitted to the shutter leaf and whereby said shutter leaf may move independently of the trigger in another direction.

8. In a photographic shutter, the combination with a support having an exposure opening therein, of a shutter blade pivotally mounted thereon, a protuberance carried thereby, a spring tending to hold the shutter blade in a normal position to cover the exposure opening, a trigger, a cover blind carried by the trigger, a pivotal mount for the trigger on which it may swing the cover blind to engage and slip off said protuberance carried by the shutter blade, means for producing slow exposures comprising a member movable relative to the support and adapted to directly engage the shutter blade whereby movement of said member may move the shutter blade to an inoperative position, in which the exposure opening is uncovered except for the cover blind, means for moving the shutter blade through engagement of the cover blind and shutter blade whereby the shutter blade may be moved from its inoperative position until the protuberance on the blade and cover blind engagement slips off, said shutter spring returning said blade to its inoperative position, the cover blind being adapted to cover said exposure opening as said trigger is released.

9. In a photographic shutter, the combination with a support having an aperture through which an exposure may be made, of a shutter blade pivotally mounted thereon and including a protuberance, a spring tending to hold the shutter blade in one position, a trigger pivotally mounted upon the support and including a pair of spaced shoulders, an arm carried by the trigger and lying between said spaced shoulders, said arm including a narrow resilient neck and including a surface adapted to engage and move the protuberance on the shutter leaf to a position in which it may slip off said protuberance as the trigger is moved in one direction whereby an exposure may be made, said narrow resilient neck being adapted to flex as the trigger moves in an opposite direction whereby the arm may slide over the protuberance.

EDWARD KOSZALKA, Jr.